Figure 1:
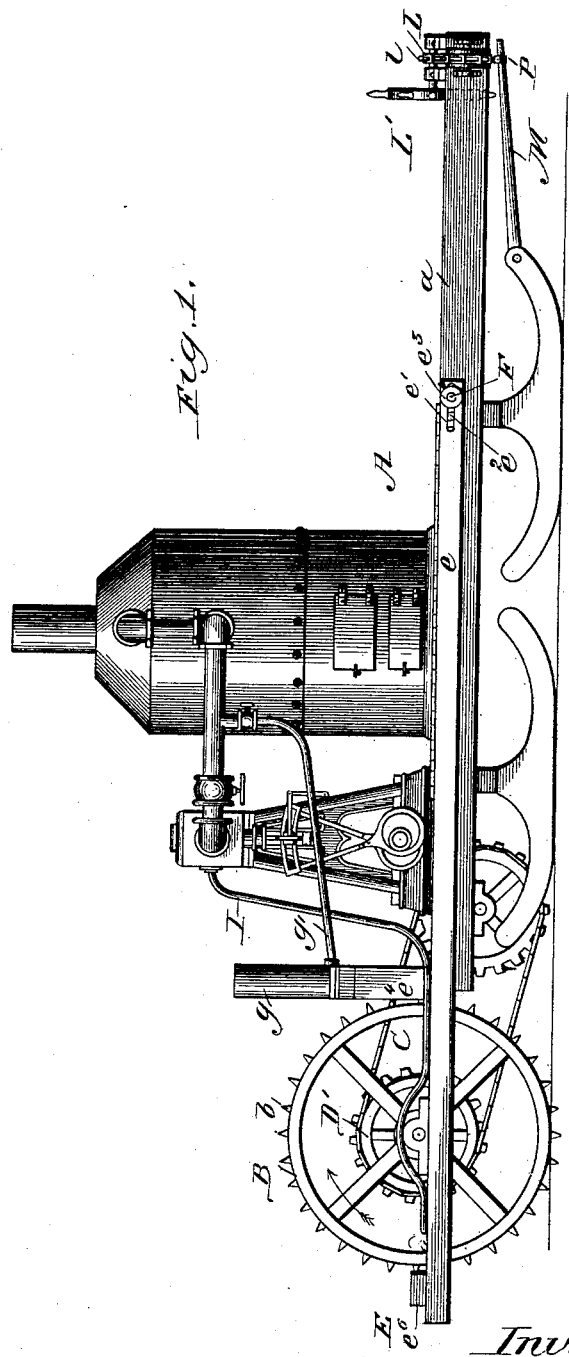

(No Model.) 2 Sheets—Sheet 1.

G. T. GLOVER.
TRACTION ENGINE.

No. 360,584. Patented Apr. 5, 1887.

Witnesses,
W. Rossiter
L. S. Logan

Inventor,
George T. Glover
By Chas. G. Page
Atty.

(No Model.) 2 Sheets—Sheet 2.
G. T. GLOVER.
TRACTION ENGINE.
No. 360,584. Patented Apr. 5, 1887.
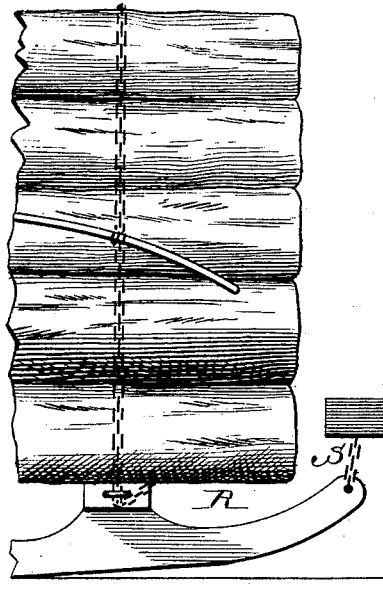
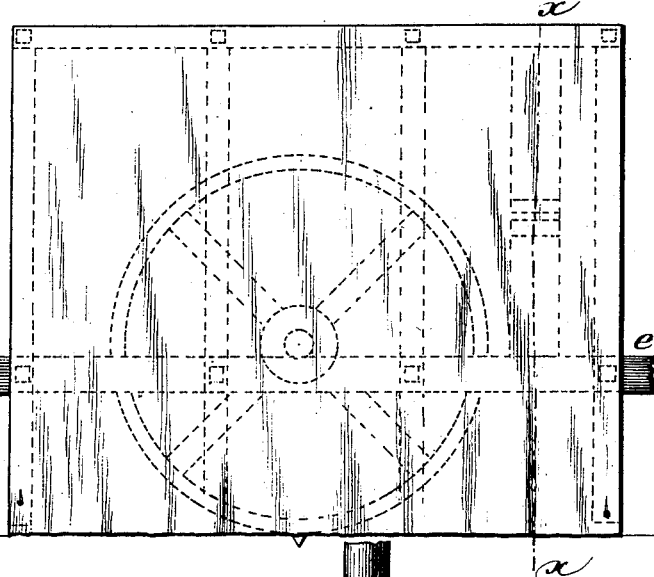
Fig. 3.
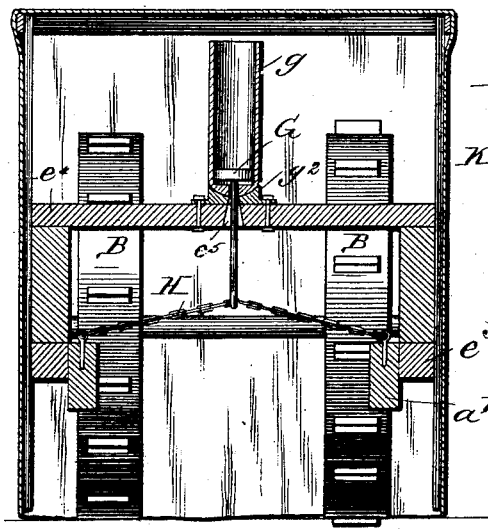
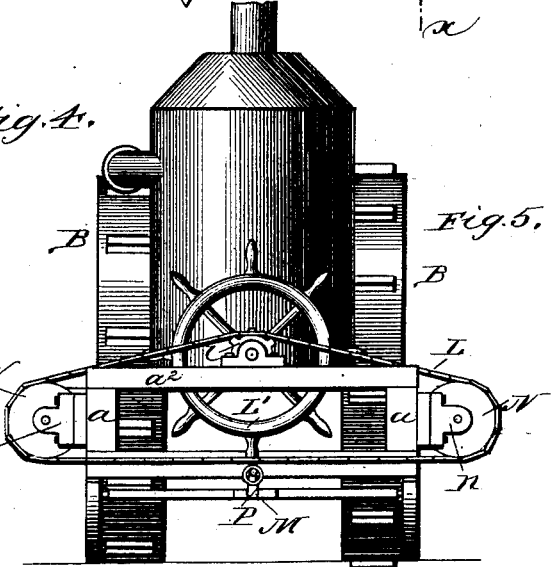
Fig. 4. Fig. 5.
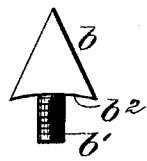
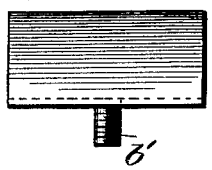
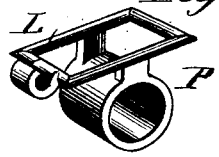
Fig. 6. Fig. 7. Fig. 8.
Witnesses
W. Rossiter
L. S. Logan
Inventor
George T. Glover
By Chas. G. Page
Atty.

UNITED STATES PATENT OFFICE.

GEORGE T. GLOVER, OF CHICAGO, ILLINOIS.

TRACTION-ENGINE.

SPECIFICATION forming part of Letters Patent No. 360,584, dated April 5, 1887.

Application filed August 19, 1886. Serial No. 211,237. (No model.)

*To all whom it may concern:*

Be it known that I, GEORGE T. GLOVER, a citizen of the United States, residing at Chicago, in the county of Cook and State of Illinois, have invented certain new and useful Improvements in Traction-Engines, of which the following is a specification.

This invention relates to an improvement in traction-engines, and to some extent to the traction-engine secured to me by Letters Patent of the United States No. 342,596, of May 25, 1886. In my said patented machine the engine-truck carrying an engine is propelled or pushed along over the road by a traction propelling attachment which has a jointed or flexible connection with the engine-truck, and which is driven from the engine by means of a pair of belt-connected sprockets, the one being secured upon the axle of the traction propelling attachment and the other being secured upon a shaft that is mounted upon the engine-truck and actuated from the engine, the said sprocket of the traction propelling attachment being arranged to stand higher than the sprocket of the engine-truck, whereby during the forward motion of the engine the upper leaf of the chain-belt which connects the two sprockets together will exert a downward pull upon the sprocket of the propelling attachment, and thereby draw said sprocket attachment bodily downward, so as to increase the traction proportionally to the resistance, the weight of the engine-truck, and the motive power. In said patented machine means are also provided for raising the end portion of the engine-truck which is nearest the traction propelling attachment and throwing said weight upon the latter, so as to increase the traction. Means are also provided in said machine for steering the traction-engine, and, as a further feature, provision is made for utilizing the exhaust-steam as a means for melting down rough ice and for supplying the water to form new ice, so as to keep an ice road in constant repair.

A further object is to adjustably connect the traction propelling attachment with the engine-truck, as well as to hinge or pivot it thereto, whereby when needed the traction propelling attachment may be adjusted bodily and relatively to the engine-truck, so as to maintain the chain-belt which connects the sprockets together in a taut condition.

In my said patented machine the transfer of a portion of the weight of the engine-truck onto the propelling attachment is effected by a hand-power device.

A further object of my present invention is to utilize the energy of steam from the boiler as a means for effecting such transfer.

A further object of my improvement is to heat the traction-wheels to a degree sufficient to cause them to melt down the snow upon a snow road, whereby the snow road may be converted into an ice road by the freezing of the melted snow, which during the winter season in the northern lumber regions will take place as soon as the snow has become melted down by the passing heated wheels.

A further object is to provide the engine with means for carrying over the snow or ice road, and in direct contact therewith, a body of heated air and steam, thereby not only melting down the snow, so as to permit the formation of an ice road, but also melting down rough ice and supplying the latter with water, so as to form new ice, and thus level and keep the road in repair.

A further object is to provide means for maintaining the traction-wheels, and, if desired, a steam lifting device, in an atmosphere impregnated with and warmed by steam.

A further object is to provide an improved construction of steering apparatus.

Further objects are to provide certain novel and improved details tending to the general efficiency of the traction-engine.

To the attainment of the above-mentioned objects and other important and useful ends, my present invention consists in matters hereinafter described, and particularly pointed out in the claims.

In an apparatus embodying the principles of my invention the arms or side bars of the traction propelling attachment are substantially on a level with the engine-truck platform, and are pivotally attached to the latter. Said arms are susceptible of a longitudinal adjustment independent of their pivots, and hence may be said to have an adjustable pivotal connection with the engine-truck, whereby the traction propelling attachment can be moved or adjusted independent of the latter, so as to hold taut the chain-belt, which serves to connect a sprocket upon the engine-truck with the sprocket of the traction propelling attachment.

The steam lifting device involves the employment of a steam-actuated piston working within a cylinder which is supported upon the propelling attachment, said piston being connected with the engine-truck in a manner whereby, when the piston is actuated in one direction by the expansive force of steam derived from the boiler, the end of the engine-truck that is nearest the propelling attachment will be raised and its weight transferred to said traction propelling attachment.

A steam-chamber for receiving either exhaust or live steam consists of a hood or casing open at the bottom and extending down to the level of the ground, its point of location being desirably such that it will inclose the traction propelling attachment and the steam-lifting device.

The steering apparatus is located at the forward end of the engine-truck, and involves an endless-chain belt conveniently operated by a hand-wheel and connected with a tongue or pole of the forward pair of wheels or runners. Said chain is arranged transversely to the length of the engine-truck, and has a yielding connection with the tongue or pole, whereby the chain may move in a right line, while the tongue or pole swings in the arc of a circle.

The teeth of the traction-wheels are detachably fitted thereto, and have their base portions, which seat against the perimeters of said wheels, made concave in correspondence with the curvature of the wheels, so that the teeth shall be prevented from turning.

Other details tending to the general efficiency of the traction-engine will be hereinafter more particularly described.

Figure 2:
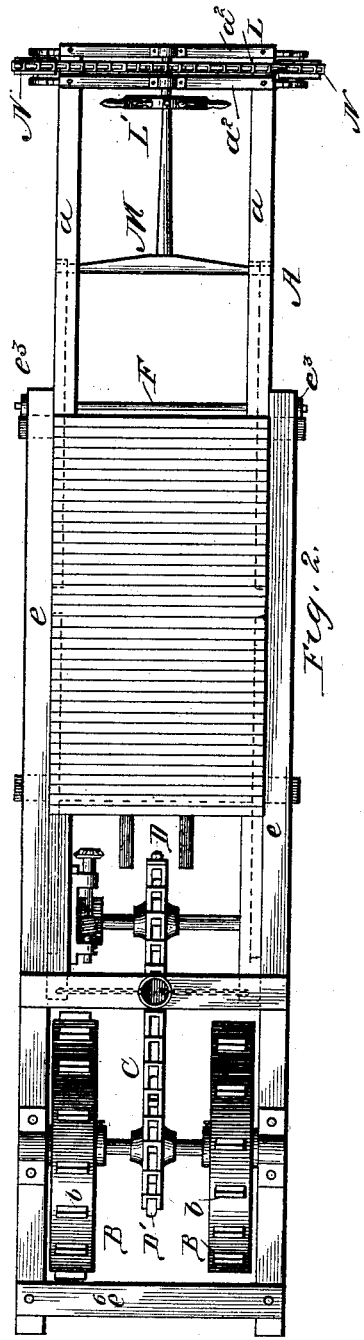

In the drawings, Figure 1 represents in side elevation a traction engine constructed in accordance with the principles of my invention. Fig. 2 is a top plan view of the same with the engine removed from the engine-truck. Fig. 3 represents in side elevation the traction propelling attachment inclosed by a hood, a portion of the traction propelling attachment being principally shown in dotted lines. This figure also includes a portion of a loaded log-sled attached to the rearwardly-extended arms or shafts of the traction propelling attachment. Fig. 4 is a transverse vertical section on the line $x\,x$ of the preceding figure. Fig. 5 is a front elevation of the traction-engine. Figs. 6 and 7 respectively represent in different positions one of the teeth that are provided for the traction-wheels. Fig. 8 is a detail representing in perspective a device which is included in the steering mechanism.

The engine car or truck A may be of any desirable construction, and supported upon either wheels or runners.

The engine may be of any type suitable for the purpose for which it is to be employed, and is mounted upon the engine-truck.

The traction-wheels B of the traction propelling attachment are driven from the engine through the medium of a chain or link belt, C, which serves to connect a sprocket, D, on the engine-truck with a sprocket, D', on the traction propelling attachment, the said sprocket which is carried by the engine-truck being lower down than the sprocket of the traction propelling attachment, and driven from the engine in any suitable way, the power-transmitting devices herein shown between the engine-shaft and said sprocket D being similar to those shown in my former patent.

The arms $e$ of the traction propelling attachment E are adjustably connected with the engine-truck frame at the points where they are hinged or pivoted thereto. This said adjustable connection between the traction propelling attachment and the engine-truck permits the former to be held back from the latter to an extent which shall at all times maintain the chain belt in a taut condition.

While various adjustable hinged or pivotal connections between the traction propelling attachment and the engine-truck could obviously be devised, I have herein shown a simple means, consisting of a rod, F, extending through the sides $a$ of the engine-truck frame and projecting out from said sides, so as to provide pivots that are received in slots $e'$, with which the arms of the traction propelling attachment are provided. The position of the pivots in these slots can be determined by wedges $e^2$, driven into the slots and varying in size and number, or both, according to the extent of adjustment necessary.

Stops of any character can be secured to the pivot, in order to hold the arms thereon, the stops herein shown being formed by collars $e^3$, fitted upon the pivots or ends of rods, and held thereon by set-screws, although, of course, nuts or other devices subserving a like purpose could be employed.

The arms of the traction propelling attachment are respectively arranged at opposite sides of the engine-truck frame, and normally lie about on a level with the truck-platform. By such arrangement the arms can exert a direct push or pull against the body of the engine-truck, and, moreover, the arms will, in fact, practically widen the engine-truck at points opposite the engine and boiler, so that the engineer can readily pass by the same.

While a variety of devices operated by steam-power could be employed for raising the rear end portion of the engine-truck, so as to throw the weight thereof upon the traction propelling attachment, I prefer to use a steam-actuated piston, G, which is connected with the engine truck frame and arranged to work in a cylinder that is connected with the traction propelling attachment in such manner that steam applied to raise the piston or drive it in one direction shall cause the rear end portion of the engine-truck to be lifted and the weight of the same to be transferred to the traction propelling attachment preferably at a point in advance of the traction-wheels. In the present illustration an upright steam-cylinder, g, open at its upper end, is seated upon a frame, $e^4$, which is secured upon and arranged to extend across from one arm to the other of the traction propelling attachment, said frame being raised somewhat above the plane occupied by said arms, as illustrated in Fig. 4. The piston working within said cylinder has its stem extended below the same and connected with a chain, H, which has its ends attached to the sides a of the engine-truck. Steam is admitted to the said piston-cylinder through a pipe, g', which connects with the boiler and communicates with the piston-cylinder under the head of the piston. When steam is turned on from the boiler, it will raise the piston, which will in turn raise the rear end portion of the truck-frame, it being evident that the expansive force of the steam below the piston-head will serve to hold down the piston-cylinder and the arms of the traction propelling attachment, and hence permit the weight of the rear end portion of the engine-truck to be thrown onto the arms of the traction propelling attachment, thereby greatly increasing the traction of the wheels. With regard to this last-mentioned portion of the engine, it is possible that there may be a disposition on the part of the truck frame or arms to have a slight rock or lateral shifting movement, or that other movement or flexure might occur—as, for example, the jar at stopping or starting—which would tend to throw the piston slightly out of the vertical, so as to cause it to either bend or bind. To provide for such contingency, the lower end of the piston-cylinder is rounded and seated in a concave socket, $g^2$, (shown in Fig. 4,) the socket-piece provided with such concavity being bolted to the upper portion of the frame $e^4$, which latter has a downwardly-expanding opening, $e^5$, formed for the passage of the piston-stem. By such arrangement the piston-cylinder has a universal-jointed connection with the propelling attachment, which will permit the desired latitude of side movement of both the said piston-cylinder and piston in any direction, and this is especially desirable in the event of starting the engine either in a forward direction or with a reverse movement, either of which may cause a slight movement of the engine-truck independently of the traction propelling attachment.

I, Fig. 1, denotes one of a pair of exhaust-steam pipes which connect with the engine-cylinder, and are extended so as to direct the jets of exhaust-steam against the traction-wheels, the points of discharge being preferably located so as to direct the steam-jets against the inner sides of the wheels. In this way the wheels will be warmed sufficiently to melt down the snow along a snow road, thereby breaking the same and permitting the formation of an ice road.

It is also desirable that the water of condensation should not only be discharged along the tracks made by the wheels, so as to permit the water to freeze and level off the tracks, but also that some of the water, and at least a portion of the heat from the exhaust-steam, should be applied to and generally distributed over the road, in order to level off and repair the same by permitting the formation of new ice. To such end I provide a hood, K, arranged to inclose the traction-wheels and preferably the piston-cylinder g, thus providing a chamber within which the exhaust-steam is received, and surrounding said members with a certain amount of exhaust-steam, and, since the hood extends down to the road-level, and is open at the bottom a body of heated air and steam will be carried along the road and in direct contact with the same. The said hood can be made of any material—as for example, it could be made of water-proofed canvas stretched upon a suitable frame, (indicated by dotted line, Fig. 3,) said frame being conveniently carried by the traction propelling attachment and covered over with canvas, which at its sides will drop down to the road-level. This feature is of great importance in the lumber regions, wherein during the winter season intense cold prevails.

The steering apparatus comprises an endless chain, L, which is operated from a hand-wheel, L', arranged at the front end portion of the truck-frame, said chain being connected with the tongue M of the forward pair of runners of the engine-truck. Said hand-wheel has its axle mounted upon cross-bars $a^2$, Fig. 2, which serve to connect together the front ends of the two sides of the engine-truck frame, the bearings for the axle of said hand-wheel being properly bolted upon said cross-bars. The hand-wheel or its axle is provided with a sprocket, l, which engages the chain L, whereby the latter can be actuated in either direction. Said chain passes over idler pulleys or sprockets N, journaled in bearings n, that are secured to the sides of the engine-truck frame. The endless chain is arranged transversely to the length of the engine-truck, and is connected with the tongue M by means of a socket or coupling, P, desirably consisting of a short hollow cylindric sleeve or tubular piece secured to one of the links of the endless chain L, as best illustrated in Fig. 8. The tongue is, at its rear end, connected with the fore pair of runners. The forward end of said tongue is received in the tubular coupling, the bore of which is somewhat larger than the diameter of the tongue, and, by reason of such construction, provision is made for the free side swing of the tongue when the chain is operated, so as to swing the tongue, and thereby turn the fore pair of runners, the connection between the tubular socket-piece and the tongue being in the nature of a yielding joint, which accommodates itself to any side swing of the tongue, it being observed that such connection is necessary, since the coupling-piece moves in a right line, while the tongue moves in the arc of a circle.

The teeth $b$ of the traction-wheels are detachable therefrom, so that different sizes of teeth can be applied, a longer tooth being necessary before the road has become hardened, while shorter teeth can be more advantageously employed after the road becomes hard. The tooth shown in Figs. 6 and 7 is wedge-shaped in cross-section and provided with a threaded stem or shank, $b'$, which is to be inserted through the rim of the wheel and held by a nut applied to its inner end. The base portion of this tooth is concave, the concavity $b^2$ being made to correspond with the perimeter of the wheel, in which way when the tooth is applied it will fit the wheel snugly and will be held against turning on the wheel.

The side bars or arms of the traction propelling attachment are connected together back of the traction-wheel by a cross-bar, $e^6$, to which the front log-sled of a train of connected log-sleds is attached. As illustrated in Fig. 3, the said log-sled R is attached to said bar of the traction propelling-frame by a chain, S. By shortening up the chain a portion of the weight of the load will be transferred to the rear end of the traction propelling attachment, and by thus applying weight in rear of the axle additional traction is secured.

I have hereinbefore described the pipes for directing steam against the traction-wheels as exhaust-steam pipes; but I desire to be understood as covering the application of either live steam or exhaust-steam for the pupose of heating the wheels, and for the further purpose of supplying steam to the open bottom chamber that is formed by the hood or casing. It is desirable to direct the steam against the inner sides rather than against the outer sides of the traction-wheels, since under the latter conditions they will be more effectively heated with reference to the work they are destined to accomplish while in a heated state. Necessarily the heating of the wheels will free them from ice, which might otherwise accumulate thereon, although the main object of heating the wheels is to permit them to break through a snow road and melt down the snow, so that the water resulting from the melted snow may freeze and thus form an ice road. For such purpose exhaust steam is unquestionably more economical than live steam, although, of course, the latter could be used if so desired.

It will also be observed that if the wheels were made hollow and provided with appropriate steam ports or openings they could be heated by the application of steam substantially the same as hereinbefore set forth.

What I claim as my invention is—

1. The combination, with the engine-truck provided with an engine, of the propelling attachment driven from the engine by a link or chain belt and jointed to the engine-truck by arms which are also adjustably connected with the engine-truck, whereby the endless-chain belt employed to transmit power from a power-transmitting mechanism on the engine-truck to the traction-wheels of the traction propelling attachment may be kept taut, substantially as described.

2. The combination, with the propelling attachment jointed to the engine-truck and driven from an engine on the latter, of the steam-actuated piston connected with an end portion of the engine-truck and operated in a cylinder which is supported from the propelling attachment, substantially as described.

3. The traction propelling attachment jointed to the engine-truck and driven from an engine on the latter, combined with a steam-actuated piston and means whereby the action of said piston shall raise an end portion of the engine-truck and transfer the weight thereof to the propelling attachment, substantially as described.

4. The combination, with a propelling attachment jointed to an engine-truck and driven from the engine on the latter, of the steam-actuated piston connected with the engine-truck and operative in a cylinder which is supported upon the propelling attachment by a jointed connection, substantially as described.

5. In a traction-engine adapted for use on ice or snow roads, the steam pipe or pipes arranged to apply steam to the wheel or wheels, so as to heat the same, substantially as described.

6. In a traction-engine for breaking and making and for travel upon snow or ice roads, an open-bottom steam-receiving chamber, combined with a source of steam-supply arranged to admit steam into said chamber, which latter has its open bottom in sufficiently close proximity to the road to cause the same to practically close the chamber at its bottom and to permit the contact with the road of the steam received and contained within said chamber, substantially as and for the purpose described.

7. A traction-engine for the purpose described, provided with one or more steam-pipes arranged to discharge the steam against the propelling traction wheel or wheels, substantially as set forth, and the traction propelling attachment connected with the engine-truck and driven from the engine, combined with a hood or casing which incloses the traction propelling-wheels and the discharge portions of the steam-pipes, for the purposes specified.

8. The combination, with a traction-engine for the purpose described, of a chain belt supported upon sprockets and carrying a socket-piece in which a tongue or pole connected with the forward wheels or runners is received, substantially as specified.

9. The combination, with the engine-truck provided with an engine, of the traction propelling attachment hinged to the engine-truck and driven from the engine through the medium of a pair of belt-connected sprockets, the one on the propelling attachment standing higher than the one on the engine-truck, for the purpose set forth, and a steam-actuated lifting mechanism adapted for raising one end portion of the engine-truck and throwing the weight thereof on the propelling attachment, in order to increase the traction, said lifting mechanism being operated from the steam-power that is employed for driving the engine, substantially as described.

10. The combination, with the engine mounted upon the engine-truck and the traction propelling attachment driven from the engine, of the hood or casing, substantially as described, inclosing the main portion of the traction propelling attachment and extending down to the road-bed, and a steam pipe or pipes leading from the engine and discharging into the space inclosed by said hood or casing, the road-bed in such instance practically constituting a bottom for the space or chamber within said hood or casing, whereby steam discharged into said chamber will be confined therein, substantially as described.

GEORGE T. GLOVER.

Witnesses:
L. S. LOGAN,
CHAS. G. PAGE.